United States Patent [19]

Mumford, III et al.

[11] Patent Number: 5,265,790

[45] Date of Patent: Nov. 30, 1993

[54] METHOD FOR JOINING BI-METALLIC TUBULARS AND A BI-METALLIC TUBULAR WELD CONFIGURATION

[75] Inventors: James D. Mumford, III, Long Valley; Vinod K. Pareek, Flemington, both of N.J.

[73] Assignee: Exxon Research & Engineering Company, Florham Park, N.J.

[21] Appl. No.: 26,905

[22] Filed: Mar. 5, 1993

[51] Int. Cl.⁵ .................... B23K 31/02; B23K 101/10
[52] U.S. Cl. .................... 228/189; 285/55; 285/286; 285/291
[58] Field of Search ............... 228/138, 189; 285/55, 285/286, 291

[56] References Cited

U.S. PATENT DOCUMENTS

| 2,943,387 | 7/1960 | Dawson | 285/55 X |
| 4,073,427 | 2/1978 | Keifert et al. | 228/189 X |

FOREIGN PATENT DOCUMENTS 96422A  3/1973  Fed. Rep. of Germany .
1-273678-A  11/1989  Japan .

*Primary Examiner*—Kenneth J. Ramsey
*Attorney, Agent, or Firm*—Estelle C. Bakun

[57] ABSTRACT

A method for joining bimetallic tubulars and a bimetallic tubular weld configuration which ensures both a continuous corrosion resistant inner lining across the joint as well as the required mechanical strength.

4 Claims, 1 Drawing Sheet

METHOD FOR JOINING BI-METALLIC TUBULARS AND A BI-METALLIC TUBULAR WELD CONFIGURATION

FIELD OF THE INVENTION

The present invention is directed to a method of joining bimetallic tubulars and a weld configuration for such bimetallic tubulars.

BACKGROUND OF THE INVENTION

Bimetallic tubulars with highly corrosion resistant inner liners can be utilized for reducing drill pipe corrosion in super sour well environments containing elemental sulfur. However, when the bimetallic tubulars are joined, alloying of the two distinct materials comprising the bimetallic tubular may occur and significantly reduce the bimetallic tubular's corrosion resistance and strength at the point of the weld. What is needed in the art is a method for welding and a weld configuration which preserves the continuity of the corrosion resistant inner liners of bimetallic tubulars and which avoids alloy formation of the different materials of the tubular layers at the weld joint.

The welding method and weld configuration of the instant invention advantageously avoid alloying of the discreet materials comprising the layers of the bimetallic tubulars when the weld joints are formed. Thus the possibility of decreased corrosion resistance and strength resulting from alloying of the two materials composing the bimetallic tubular in the weld configuration is eliminated.

SUMMARY OF THE INVENTION

The present invention is directed to a method of joining bimetallic tubulars and the weld configuration resulting therefrom.

The method comprises:
(a) joining a first and a second bimetallic tubular each having an inner layer comprised of a first composition, and an outer layer comprised of a second composition, wherein said inner layer extends beyond said outer layer at the area to be joined;
(b) circumferentially butt welding said inner layers of said first and said second bimetallic tubular such that said butt weld does not contact said outer layers of said first and said second bimetallic tubular and wherein said butt weld consists essentially of said first composition;
(c) circumferentially lap welding a sleeve having a first and second end, to said outer layers of said bimetallic tubulars at each of said sleeve ends, said sleeve slidingly engaged with said bimetallic tubular and encompassing said butt weld, said sleeve being comprised of said second composition, wherein said sleeve is of a length extending beyond said butt weld such that when said lap welding occurs said lap welds do not contact said inner layers of said butt weld, and wherein said lap weld consists essentially of said second composition of said bimetallic tubulars.

The weld configuration comprises:
(a) a first and a second bimetallic tubular each having a first and second end and an inner layer of a first composition and an outer layer of a second composition wherein said inner layer extends beyond said outer layer at said first end of said bimetallic tubular and wherein said bimetallic tubulars are aligned at said first end in butting relationship;
(b) a circumferential butt weld joining said inner layers at said first ends of said bimetallic tubulars, said butt weld consisting essentially of the same material as said inner layers of said bimetallic tubulars;
(c) a sleeve having a first and second end, said sleeve consisting essentially of the same material as said outer layers of said bimetallic tubulars, said sleeve surrounding said butt weld and of sufficient length such that said first and second ends of said sleeve contact only said outer layers of said first and said second bimetallic tubulars;
(d) a circumferential lap weld joining said sleeve to said outer layers of said bimetallic tubulars and located at each of said first and second ends of said sleeve, said lap weld consisting essentially of the same material as said outer layers of said bimetallic tubulars and contacting only said outer layers of said bimetallic tubulars.

BRIEF DESCRIPTION OF THE DRAWINGS

FIG. 1A shows the preferred weld joint wherein the bimetallic tubulars being joined are fashioned in such a way that the inner layer extends beyond the outer layer end but is tapered to provide a V-groove butt weld configuration for the inner layer when two separate lengths of bimetallic tubulars are placed end to end in a straight line. In both FIGS. 1A and 1B the bimetallic tubulars having an inner layer (1) and an outer layer (2) are butt welded (4) where the butt weld penetrates only (1), and a sleeve (3) is placed over the butt weld, which sleeve is lap welded (5) such that the lap weld penetrates only (2) and (3).

DETAILED DESCRIPTION OF THE INVENTION

Figure 1A:
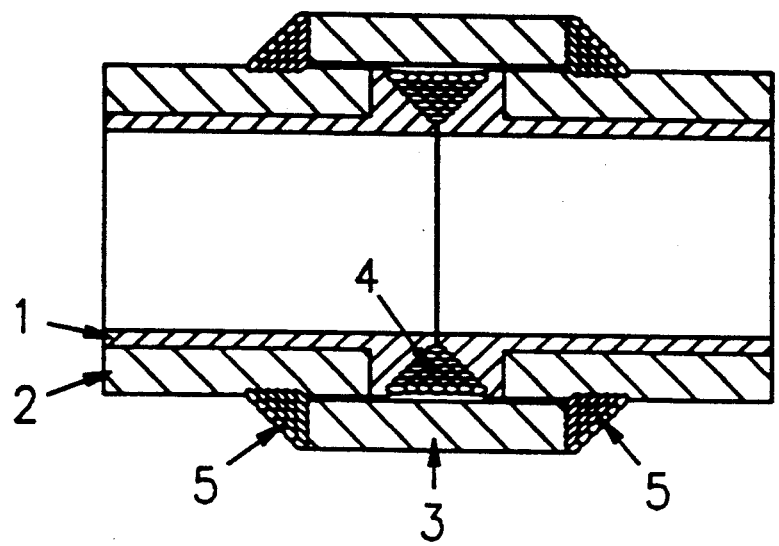
FIG. 1A shows a cross sectional view of a preferred weld joint for a bimetallic tubular.
Figure 1B:
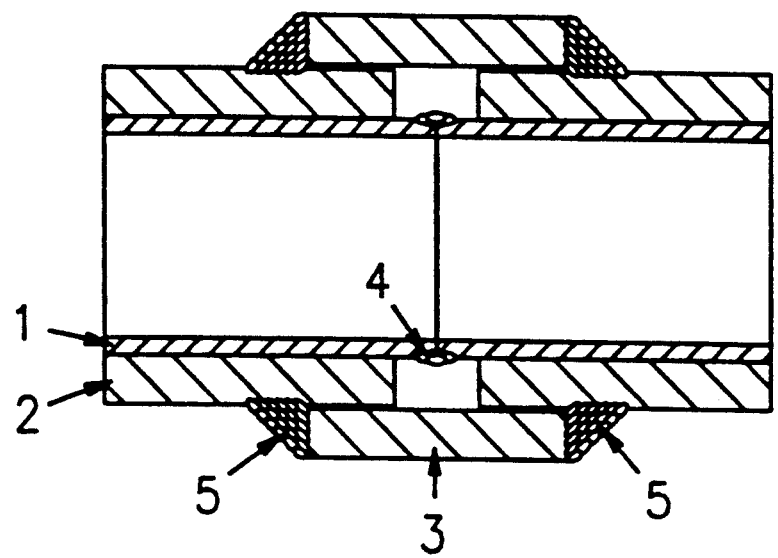
FIG. 1B shows a second weld joint for a bimetallic tubular.

Bimetallic tubulars are tubes comprised of two layers, each consisting of two distinct and separate materials wherein the second or outer layer (2) circumferentially surrounds and is bonded to the first or inner layer (1). The materials comprising the layers of the bimetallic tubulars can be pure metals or alloys. During a conventional welding procedure, the materials of the inner and outer layers (2) mix forming an alloy which is more apt to corrode and/or lose strength than the layers of the bimetallic tubulars themselves. Applicants' welding procedure prevents such alloying of the distinct materials of the two layers and maintains the integrity of the inner and outer layers (2). Maintaining the integrity means that a continuous layer is formed for both the inner and outer layers (2) following applicants' welding procedure. The sleeve (3) utilized in applicants' method further adds to the strength of the welded bimetallic tubulars at the weld joint. Applicants' weld method and weld configuration are particularly advantageous for bimetallic tubulars having a corrosion resistant inner layer (1).

The welding method begins with a bimetallic tubular wherein the ends of the inner layer (1) extend beyond the ends of the outer layer (2). The extension provides an area where a circumferential butt weld (4) can be prepared without any of the welding material contacting the outer layer (2) and forming an alloy. Preferably, the bimetallic tubulars would be available with extending inner layers (1). However, if the ends of the inner and outer layers (2) are flush, a portion of the outer layer (2) can be ground away or removed in any manner to expose a suitable length of inner layer (1). A suitable length of inner layer (1) is one allowing for the butt weld (4) to be prepared without it contacting the outer layer (2). This is easily determined by one skilled in the art. To maintain the integrity of the inner layer (1), the butt weld (4) is prepared such that upon completion of the weld, the weld consists essentially of the same material as the inner layer (1). For example, if the inner layer (1) were niobium, the butt weld (4) would also be niobium. If the inner layer (1) were an alloy of titanium, the butt weld (4) would also be the titanium alloy. By utilizing the same welding material as the composition of the inner layer (1), the integrity of the inner layer (1) is maintained and one continuous tube is formed.

During the welding of bimetallic tubulars having layers comprised of alloys, it is possible that one of the metals forming the alloy may volatilize during the welding process. In such a case, the welding material will contain an additional amount of the volatile metal such that upon completion of the weld the weld consists essentially of the same material as the layer of the bimetallic tubular being welded. The additional amount of volatile metal necessary depends upon the composition of the layer of the bimetallic tubular and is readily determinable by one skilled in the art. In such a case the initial welding material will be enhanced with the volatile metal or metals in an amount which is equivalent to the amount vaporized during the welding procedure.

The method of the present invention can be applied to bimetallic tubulars whose layers are comprised of any individual metals or alloys of any metals. All metals of the periodic table and alloys thereof are contemplated as comprising the layers of the bimetallic tubulars. Preferably the inner layers (1) will be comprised of niobium. Likewise, the outer layer (2) will preferably be comprised of carbon steel.

Preferably, the bimetallic tubulars will be fashioned such that the inner layer (1) extends beyond the outer layer (2) and is formed to overlap the contour of the outer layer's (2) end but is tapered to provide a V-Groove butt weld (4) configuration for the inner layer (1) when two separate lengths of bimetallic tubular are placed end to end in a straight line (SEE FIG. 1A).

Once the butt weld (4) is complete, a sleeve (3) composed of the same material as the outer layer (2) and slidably engaging said bimetallic tubulars, is placed around the butt weld (4). The sleeve (3) length is such that it extends beyond the butt weld (4) for a length sufficient to allow for lap welding (5) at each of its ends without the lap welds (5) formed coming into contact with the inner layer (1) or the butt weld (4). The sleeve (3) is then circumferentially lap welded (5) to the outer layer (2) using essentially the same material the sleeve (3) and outer layer (2) are made of. Again, if the outer layer is an alloy, certain metals of the alloy may vaporize during the welding procedure. In such a case the welding material will contain an additional amount of the vaporizable metal which will compensate for the loss of such metal during welding enabling the weld to consist essentially of the same material of said sleeve (3) and said outer layer (2) once the welding is complete. By utilizing the same materials as the outer layer (2) for both the sleeve (3) and lap weld (5) material, the integrity of the outer layer is maintained, and no alloying between the sleeve (3) and outer layer (2) occurs. By utilizing a sleeve (3) such that its ends contact only the outer tubing, no alloy is formed with the inner tubing upon preparation of the lap weld (5).

Both the lap weld and the butt weld (4) can be prepared using standard methods known to those skilled in the art. For example ASME Section IX weld methods can be used.

What is claimed is:

1. Method for joining bimetallic tubulars comprising:
    (a) joining a first and a second bimetallic tubular each having an inner layer comprised of a first composition, and an outer layer comprised of a second composition, wherein said inner layer extends beyond said outer layer at the area to be joined;
    (b) circumferentially butt welding said inner layers of said first and said second bimetallic tubular such that said butt weld does not contact said outer tubes of said first and said second bimetallic tubular and wherein said butt weld consists essentially of said first composition;
    (c) circumferentially lap welding a sleeve having a first and second end, said sleeve slidingly engaged with said bimetallic tubular and encompassing said butt weld, said sleeve being comprised of said second composition, to said outer layers of said bimetallic tubulars at each of said sleeve ends, wherein said sleeve is of a length extending beyond said butt weld such that when said lap welding occurs said lap welds do not contact said inner layers or said butt weld, and wherein said lap weld consists essentially of said second composition of said bimetallic tubulars.

2. A method of joining bi-metallic tubulars according to claim 1 wherein said butt weld comprises an alloy, said alloy is enhanced with an additional amount of any volatile metal that may be vaporized during said butt welding to provide a butt weld consisting essentially of said first composition when said butt welding is complete.

3. A weld configuration comprising:
    (a) a first and a second bimetallic tubular each having a first and second end and an inner layer of a first composition and an outer layer of a second composition wherein said inner layer extends beyond said outer layer at said first end of said bimetallic tubular and wherein said bimetallic tubulars are aligned at said first end in butting relationship;
    (b) a circumferential butt weld joining said inner layers at said first ends of said bimetallic tubulars, said butt weld consisting essentially of the same material as said inner layers of said bimetallic tubulars;
    (c) a sleeve having a first and second end, said sleeve consisting essentially of the same material as said outer layers of said bimetallic tubulars, said sleeve surrounding said butt weld and of sufficient length such that said first and second ends of said sleeve contact only said outer layers of said first and said second bimetallic tubulars;
    (d) a circumferential lap weld joining said sleeve to said outer layers of said bimetallic tubulars and located at each of said first and second ends of said sleeve, said lap weld consisting essentially of the same material as said outer layers of said bimetallic tubulars and contacting only said outer layers of said bimetallic tubulars.

4. A weld configuration according to claim 3 comprising a first and second bimetallic tubulars each having an inner layer of a first composition and an an outer layer of a second composition are bimetallic tubulars wherein said inner layer extends beyond said outer layer and is formed to overlap said outer layer such that a V-groove butt weld is formed when two lengths of said bimetallic tubulars are placed end to end in a straight line.

* * * * *